March 8, 1932.  C. CONE  1,848,162
SHEET GLASS APPARATUS
Filed July 6, 1931   2 Sheets-Sheet 1
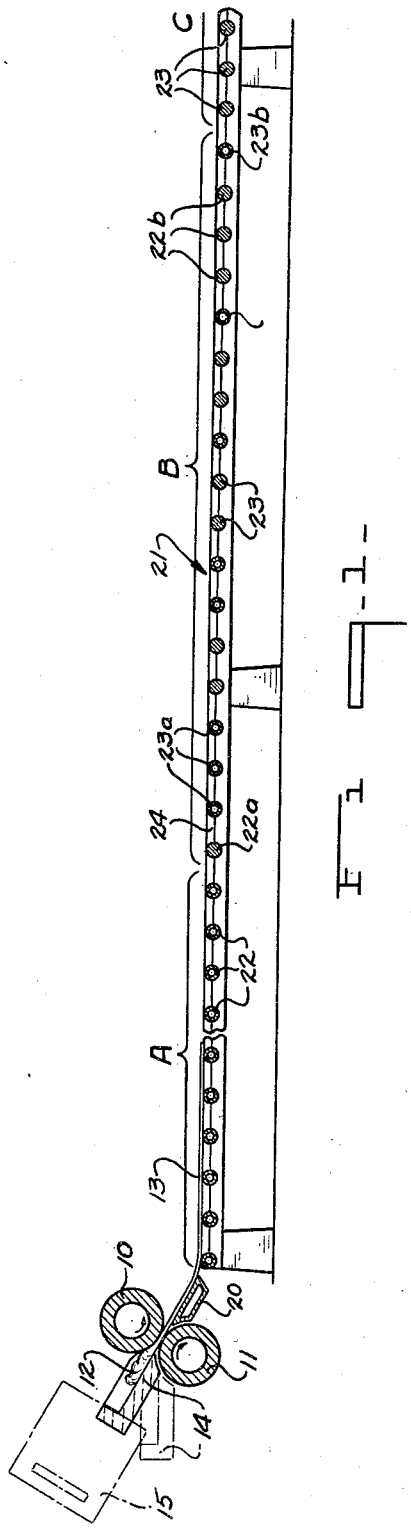
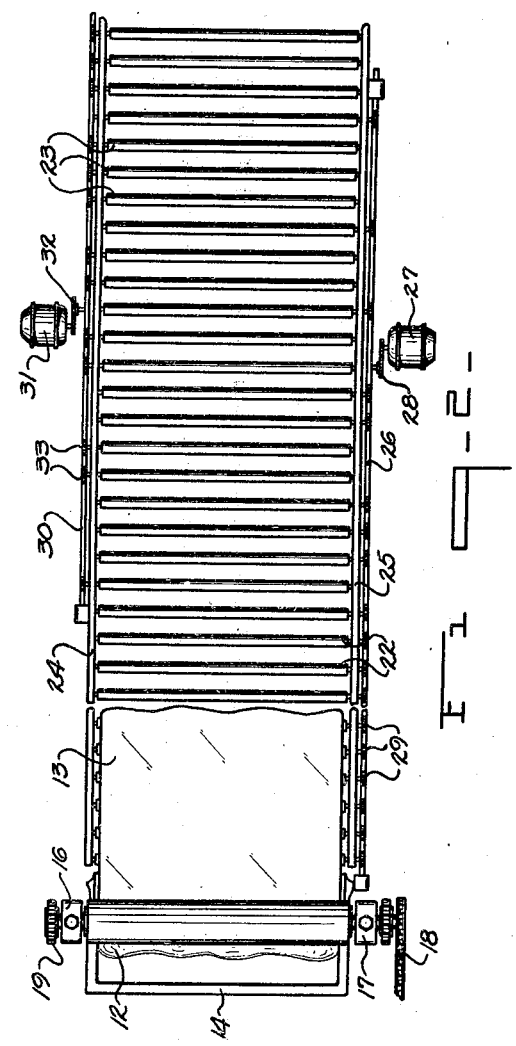
Inventor
Carroll Cone
By Frank Fraser
Attorney

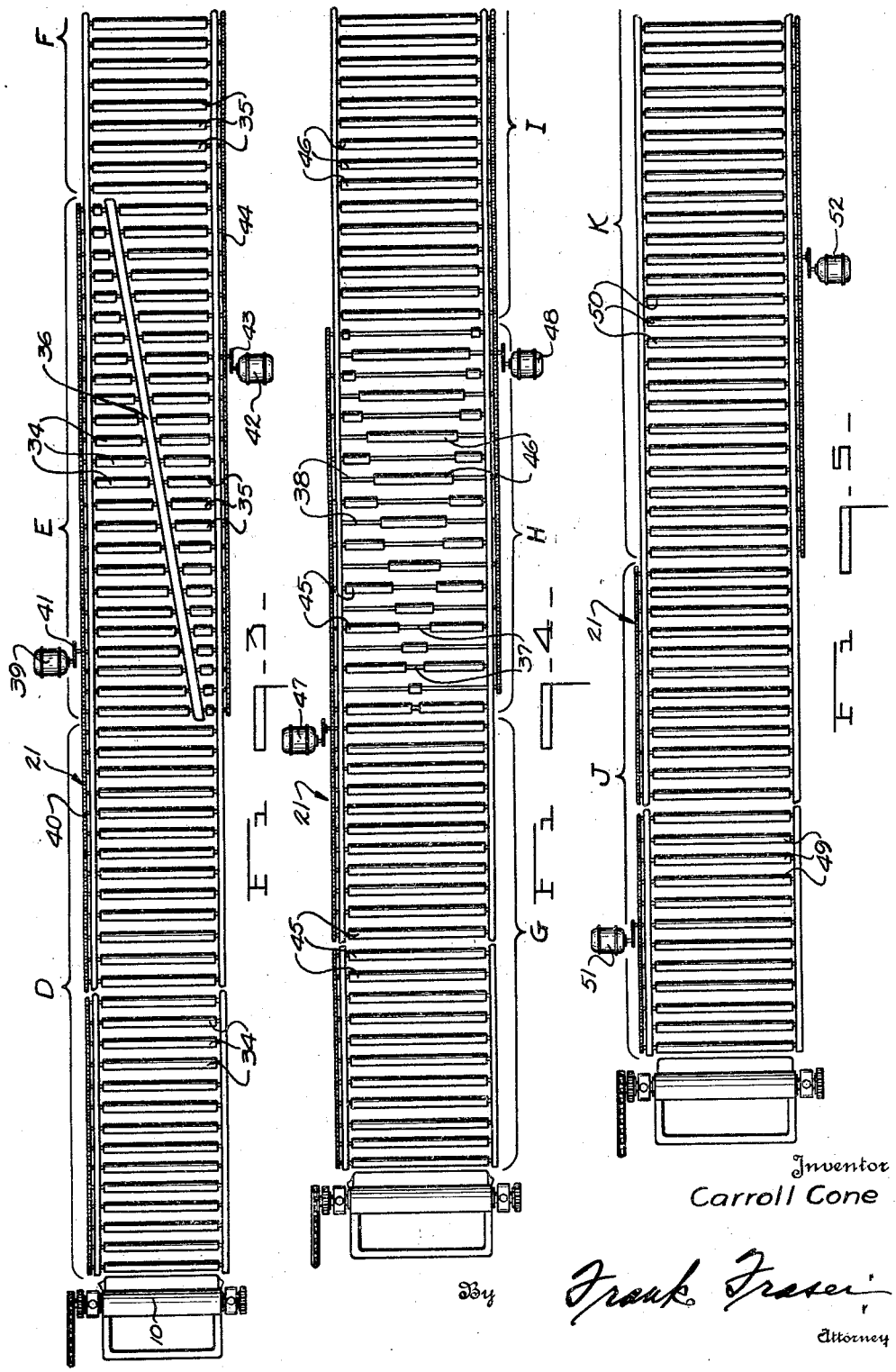

Patented Mar. 8, 1932

1,848,162

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed July 6, 1931. Serial No. 548,785.

The present invention relates broadly to sheet glass apparatus and more particularly to conveying means for supporting and carrying semi-plastic sheets of glass forwardly into and/or through an annealing zone or leer.

The conveying means herein provided is primarily adapted for use in conjunction with a sheet glass rolling machine of the intermittent type such as, for example, that known as the Bicheroux machine. In the production of successive sheets of glass by an intermittent rolling operation, it is desirable that the formation of the sheets be performed at a relatively great speed as compared to the speed at which they travel in annealing. This rapid formation of the glass sheets is desirable from both the standpoint of production and quality, while the forward travel thereof during annealing is necessarily slow in order to avoid making the annealing apparatus of great length.

The object of this invention, therefore, resides generally in the provision of means whereby the glass sheets may be formed at a relatively high rate of speed and subsequently annealed while traveling at a speed relatively less than the forming speed, the forward speed of travel of the sheets being reduced subsequent to their formation and preferably prior to or at the beginning of the annealing operation to the end that, although the sheets are formed at a high rate of speed, a relatively annealing leer may nevertheless be employed.

Heretofore, various schemes have been proposed for effecting the desired reduction in the speed of forward travel of the glass sheet but in practically all of such schemes, various types of mechanisms were associated with the rolls of the roller conveyors for effecting the desired change in the peripheral speed thereof.

According to the present invention, however, the forward speed of travel of the sheet is reduced in an easy and convenient manner and without the use of any complicated speed changing mechanisms. Thus, the high speed rolls of the roller conveyor are always driven at a constant high speed while the low speed rolls are always driven at a constant slow speed so that, in order to effect the desired change in the forward speed of travel of the sheet, no change in the speed of rotation of the individual rolls is required.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through one form of apparatus provided by the present invention, Fig. 2 is a plan view thereof, and Figs. 3, 4 and 5 are plan views showing different arrangements.

Referring first to Figs. 1 and 2 of the drawings, the means herein employed in the formation of the glass sheets comprises a rolling machine including the spaced forming rolls 10 and 11 between which a mass or charge of molten glass 12 is adapted to be passed and reduced to a sheet 13 of substantially predetermined and uniform thickness. The mass of glass 12 is initially deposited upon a tiltable receiver 14 from a portable pot or other receptacle 15 and from which it then flows between the forming rolls 10 and 11. These forming rolls are spaced from one another to create a sheet forming pass therebetween and are mounted upon shafts rotatably supported at their opposite ends by the bracket members 16 and 17. As pointed out above, it is desirable that the charge of molten glass 12 be rapidly reduced to sheet form, and the forming rolls 10 and 11 are consequently driven at a relatively high peripheral speed during the supplying of the molten glass thereto. One of the forming rolls may be positively driven as by suitable driving means 18 and the other roll driven from the first roll through intermeshing gears 19 mounted upon the roll shafts.

The glass sheet or plate 13 is supported as it leaves the forming rolls 10 and 11 upon an inclined apron or slab 20. Positioned adjacent the slab 20 and adapted to receive the glass sheet therefrom is a horizontal runway consisting of a roller conveyor designated in its entirety by the numeral 21 and being composed of a relatively large number of horizontally aligned rolls 22 and 23 rotatably mounted at their opposite ends in the frame members 24 and 25. The rolls 22 are adapted to be driven at a constant relatively high rate of speed substantially equal to the speed of formation of the glass sheet 13 which may be in the neighborhood of sixty feet per minute, while the rolls 23 are driven at a constant relatively slower speed substantially equal to that at which the sheets are adapted to travel in annealing and which may be, for example, approximately ten feet per minute.

For the purpose of driving the rolls 22 and 23, there may be provided at one side of the conveyor 21 a longitudinally extending line shaft 26 driven from a motor 27 through suitable reduction gearing 28. This line shaft is adapted to have keyed thereto a plurality of worms (not shown) meshing with and driving worm gears 29 mounted upon the adjacent ends of rolls 22. The rolls 23 may be driven in the same manner from a line shaft 30 located at the opposite side of the conveyor and driven from a motor 31 through the reduction gearing 32, said line shaft also having mounted thereupon a plurality of worms (not shown) meshing with and driving worm gears 33 at the adjacent ends of the said roll 23.

The rolls 22 and 23 of conveyor 21 may be divided by way of illustration into three groups or sections A, B and C respectively, the group A constituting a high speed section, group B a transfer or speed changing section, and group C a slow speed section. The high speed section A is composed entirely of high speed rolls 22, and the slow speed section C entirely of low speed rolls 23. On the other hand, the transfer section B is composed of a plurality of both high speed rolls 22 and low speed rolls 23, these rolls being grouped or interspersed with one another in such a manner as to effect a gradual slowing down of the forward speed of travel of the sheet as it is carried thereover. Thus, at the forward end of transfer section B a relatively larger number of high speed rolls 22 than low speeds rolls 23 are used, with the number of low speed rolls interspersed with the high speed rolls gradually increasing toward the opposite end of the said transfer section so that the forward speed of movement of the sheet is reduced by a gradual change in the grouping of the high and low speed rolls. For instance, at the extreme forward end of the speed changing section B only a single low speed roll 22a is provided, and this low speed roll is followed by three high speed rolls 23a. However, it will be seen that the number of high speed rolls is gradually decreased from left to right, while the number of low speed rolls is correspondingly increased so that at the extreme opposite end of the speed changing section B there is provided a single high speed roll 23b which is preceded by the three low speed rolls 22b.

With such an arrangement of high and low speed rolls as described above, it will be readily apparent that, as the sheet 13 passes onto and over the transfer section B, the resistance offered to the movement thereof by the low speed rolls will gradually increase and that, as this resistance increases to a point sufficient to overcome the driving action of the high speed rolls, the speed of forward movement of the sheet will be gradually reduced. Explaining more fully, when the glass sheet 13 issuing from the rolling machine is first received upon the high speed rolls 22 of roller section A, the said sheet will be carried forwardly at a speed equal to its speed of formation and delivered at such speed onto the first rolls of the transfer section B. As the sheet passes onto transfer section B, the low speed rolls at the forward end thereof will offer no appreciable resistance to the passage of the glass thereover, as a result of which the said sheet will continue to travel over a portion of the transfer section at high speed, being shoved over the low speed rolls. When, however, upon continued forward movement of the sheet, a greater portion of the sheet is brought to rest upon the low speed rolls of section B than upon the high speed rolls, then the resistance offered by these low speed rolls becomes appreciable and, as a consequence, there is some slippage between the sheet and the high speed rolls, which slippage gradually increases as the number of high speed rolls driving the sheet diminishes. In this manner, the speed of forward travel of the sheet will gradually be reduced to the speed of rotation of the rolls 23 and will be delivered at such reduced speed onto the rolls of section C. The transfer mechanism here described may, if desired, be positioned either entirely exteriorly of the annealing leer or in the forward or receiving end thereof so that the sheet may be delivered into the leer at rolling speed, with the reduction in the speed of travel thereof taking place after it is either partially or entirely received within said leer.

From the above, it will be readily apparent that the desired reduction in the forward speed of travel of the sheet 13 can be effected in an easy and convenient manner and that the use of complicated speed changing mechanism is entirely eliminated. The high speed rolls 22 are always driven at a constant high speed, and the low speed rolls 23 always driven at a constant slow speed so that the change in the forward speed of travel of the sheet is effected simply by varying the ratio of resistance of the high and low speed rolls to the movement of the sheet and without varying the peripheral speed of the rolls themselves. In other words, the reduction in the speed of travel of the sheet is accomplished by supporting the sheet during its movement upon a gradually increasing number of slow speed rolls which eventually overcome the driving action of the high speed rolls.

In Figs. 3, 4 and 5 are shown three different forms of apparatus embodying the same principle of the present invention described hereinabove and whereby the same objects may be achieved. Referring first to Fig. 3, the runway or roller conveyor 21 comprises the high and low speed rolls 34 and 35 respectively, divided into the three groups D, E and F, constituting the receiving section, transfer section and slow speed section respectively. The high speed section D is composed entirely of high speed rolls 34, and the slow speed section F entirely of low speed rolls 35. However, the transfer section E is split diagonally as at 36, and is composed of both high and low speed rolls 34 and 35. The high and low speed rolls of section E are positioned in alignment with one another at opposite sides of the split 36, with the high speed rolls 34 gradually decreasing in length from receiving section D to section F, while the slow speed rolls 35 gradually increase in length. The high speed rolls 34 may be driven from a motor 39 driving a sprocket chain 40 through reduction gearing 41, said sprocket chain being trained about sprockets (not shown) carried at the adjacent ends of rolls 34. The low speed rolls 35 may be driven in substantially the same manner from a motor 42 driving through reduction gearing 43 a sprocket chain 44 trained about sprockets carried at the ends of rolls 35. With this arrangement, as the sheet is passed from receiving section D onto and over transfer section E, the resistance offered to the forward movement of the sheet by the slow speed rolls 35 will gradually increase, as the driving force of the high speed rolls 34 is gradually decreased, as a result of which there will be effected a gradual reduction in the forward speed of travel of the sheet. In other words, the sheet supporting surface of the low speed rolls gradually increases as that of the high speed rolls decreases.

In Fig. 4, the runway 21 is composed of a series of high speed rolls 45 and a series of low speed rolls 46 which may be divided into three groups G, H and I. group G constituting the high speed section and being composed entirely of high speed rolls 45, while group I may be termed the slow speed section, being composed entirely of low speed rolls 46. On the other hand, the group H is the transfer or speed changing section and is composed of both high speed and low speed rolls 45 and 46 arranged alternately with one another. In this case, the forward speed of travel of the sheet is gradually reduced by varying the ratio of the supporting surface of the rolls 45 and 46. For instance, the high speed rolls 45 are cut away at their centers as indicated at 37, with the said cut away portions gradually increasing in length transversely of the conveyor from section G to section I, thereby resulting in a gradual reduction in the supporting face of the said rolls. The low speed rolls 46 arranged alternately with the high speed rolls 45 are cut away at their opposite ends as indicated at 38 and these cut away portions gradually decrease in length transversely of the conveyor from section G to section I so that the supporting surface of these rolls is gradually increased. As in the two forms of the invention described above, the resistance offered to the forward travel of the sheet by the low speed rolls will gradually increase as the said sheet is passed over the transfer section H, and this increasing resistance offered by the low speed rolls will effect a gradual reduction in the forward speed of travel of the sheet. The high and low speed rolls 45 and 46 may be driven from motors 47 and 48 respectively in the same manner as the rolls 34 and 35 in Fig. 3.

The form of the invention illustrated in Fig. 5 is somewhat different from those described hereinabove in that the runway 21 is divided into but two sections, the receiving section J composed entirely of high speed rolls 49, and the slow speed section K composed entirely of low speed rolls 50, driven respectively from the motors 51 and 52. The rolls 49 are driven at a constant high speed equal to the speed of formation of the sheet, while the rolls 50 are driven at a relatively slower speed substantially equal to the speed at which the sheet is adapted to travel in annealing. In this case, the sheet is passed directly from the high speed rolls 49 of section J onto the low speed rolls 50 of section K, so that the forward speed of travel of the sheet will be gradually reduced as the resistance offered by the rolls 50 overcomes the driving action of the rolls 49.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for supporting and conveying sheet glass in a predetermined path, a roller conveyor composed of a series of horizontally arranged rotatable high speed and low speed rolls which are adapted to carry the sheet forwardly, the sheet supporting surface of the low speed rolls gradually increasing from one end of the conveyor to the other while the supporting surface of the high speed rolls decreases whereby the resistance offered by the low speed rolls to the forward travel of the sheet will gradually increase so as to effect a gradual reduction in the speed of movement thereof.

2. In apparatus for supporting and conveying sheet glass in a predetermined path, a roller conveyer including a high speed section composed of a series of horizontally arranged rotatable rolls driven at a constant relatively high speed, a slow speed section composed of a series of horizontally arranged rotatable rolls driven at a constant relatively slow speed, and a transfer section interposed between said high speed and slow speed sections and composed of a plurality of horizontally arranged rotatable high speed and low speed rolls, the sheet supporting surface of the low speed rolls gradually increasing from the high speed section to the slow speed section while the supporting surface of the high speed rolls decreases whereby the resistance offered by the low speed rolls to the forward travel of the sheet will gradually increase so as to effect a gradual reduction in the speed of movement thereof.

3. In apparatus for supporting and conveying sheet glass in a predetermined path, a roller conveyor composed of a series of horizontally arranged rotatable high speed rolls and low speed rolls which are adapted to carry the sheet forwardly, said high speed and low speed rolls being interspersed with one another, with the said low speed rolls increasing in number from one end of the conveyor to the opposite end thereof while the number of the high speed rolls decreases whereby the resistance offered by the low speed rolls to the forward travel of the sheet will gradually increase so as to effect a gradual reduction in the speed of movement thereof.

4. In apparatus for supporting and conveying sheet glass in a predetermined path, a roller conveyor including a high speed section composed of a series of horizontally arranged rotatable rolls driven at a constant relatively high speed, a slow speed section composed of a series of horizontally arranged rotatable rolls driven at a constant relatively slow speed, and a transfer section interposed between said high speed and slow speed sections and composed of a plurality of horizontally arranged rotatable high speed and low speed rolls interspersed with one another, with the said low speed rolls increasing in number from the high speed section to the slow speed section while the number of high speed rolls decreases whereby the resistance offered by the low speed rolls to the forward travel of the sheet will gradually increase so as to effect a gradual reduction in the speed of movement thereof.

5. In apparatus for supporting and conveying sheet glass in a predetermined path, a roller conveyor composed of a series of horizontally arranged rotatable high speed and low speed rolls which are adapted to carry the sheet forwardly, the said high and low speed rolls being arranged end to end in substantial alignment with one another, the high speed rolls decreasing in length and the low speed rolls correspondingly increasing in length from the forward end of the conveyor to the opposite end thereof whereby the resistance offered by the low speed rolls to the forward travel of the sheet will gradually increase so as to effect a gradual reduction in the speed of forward movement thereof.

6. In apparatus for supporting and conveying sheet glass in a predetermined path, a roller conveyor including a high speed section composed of a series of horizontally arranged rotatable rolls driven at a constant relatively high speed, a slow speed section composed of a series of horizontally arranged rotatable rolls driven at a constant relatively slow speed, and a transfer section interposed between said high speed and slow speed sections, said transfer section being composed of a plurality of horizontally arranged rotatable high speed and low speed rolls which are adapted to carry the sheet forwardly, the said high and low speed rolls being arranged end to end transversely of the conveyor, the high speed rolls decreasing in length and the low speed rolls correspondingly increasing in length from the high speed section to the slow speed section whereby the resistance offered by the low speed rolls to the forward travel of the sheet will gradually increase so as to effect a gradual reduction in the speed of forward travel thereof.

7. In apparatus for supporting and conveying sheet glass in a predetermined path, a roller conveyor composed of a series of horizontally arranged rotatable high speed and low speed rolls which are adapted to carry the sheet forwardly, the high and low speed rolls being arranged alternately with one another, with the sheet supporting surface of the low speed rolls gradually increasing and the sheet supporting surface of the high speed rolls correspondingly decreasing from the forward end of the conveyor to the opposite end thereof whereby the resistance offered by the low speed rolls to the forward travel of the sheet will gradually increase so as to effect a gradual reduction in the speed of forward movement thereof.

8. In apparatus for supporting and conveying sheet glass in a predetermined path, a roller conveyor including a high speed section composed of a series of horizontally arranged rotatable rolls driven at a constant relatively high speed, a slow speed section composed of a series of horizontally arranged rotatable rolls driven at a constant relatively slow speed, and a transfer section interposed between the high speed and slow speed sections, said transfer section being composed of a plurality of horizontally arranged rotatable high speed rolls and low speed rolls which are adapted to carry the sheet forwardly, said high and low speed rolls being arranged alternately with one another, with the sheet supporting surface of the low speed rolls gradually increasing and the sheet supporting surface of the high speed rolls correspondingly decreasing from the high speed section to the slow speed section whereby the resistance offered by the low speed rolls to the forward travel of the sheet will gradually increase so as to effect a gradual reduction in the speed of forward movement of the sheet.

Signed at Toledo, in the county of Lucas and State of Ohio, this 29th day of June, 1931.

CARROLL CONE.

CERTIFICATE OF CORRECTION.

Patent No. 1,848,162.                                                   Granted March 8, 1932, to

CARROLL CONE.

It is hereby certified that error appears in the printed specification of the above numbered patent requiring correction as follows: Page 1, line 34, before the word "annealing" insert the word short; and that the said Letters Patent should be read with this correction therein that the same may conform to the record of the case in the Patent Office.

Signed and sealed this 3rd day of May, A. D. 1932.

(Seal)                                                                                       M. J. Moore,
Acting Commissioner of Patents.